United States Patent
Xu et al.

(10) Patent No.: US 11,575,835 B2
(45) Date of Patent: Feb. 7, 2023

(54) MULTI-AXIS IMAGE SENSOR SHIFTING SYSTEM

(71) Applicant: Apple Inc., Cupertino, CA (US)

(72) Inventors: Bin Xu, Sunnyvale, CA (US); Aurelien R. Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/481,202

(22) Filed: Sep. 21, 2021

(65) Prior Publication Data
US 2022/0094853 A1    Mar. 24, 2022

Related U.S. Application Data

(60) Provisional application No. 63/082,989, filed on Sep. 24, 2020.

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01); *H04N 5/2254* (2013.01); *H04N 5/23267* (2013.01)

(58) Field of Classification Search
CPC ............. H04N 5/23287; H04N 5/2253; H04N 5/2254; H04N 5/23267
See application file for complete search history.

(56) References Cited

U.S. PATENT DOCUMENTS

| 7,612,953 | B2 | 11/2009 | Nagai et al. |
| 7,630,618 | B2 | 12/2009 | Nomura |
| 7,952,612 | B2 | 5/2011 | Kakkori |
| 8,111,295 | B2 | 2/2012 | Makimoto et al. |
| 8,248,497 | B2 | 8/2012 | Tanimura et al. |
| 8,264,549 | B2 | 9/2012 | Towika et al. |

(Continued)

FOREIGN PATENT DOCUMENTS

| CN | 101808191 | 8/2010 |
| CN | 102135656 | 7/2011 |

(Continued)

OTHER PUBLICATIONS

U.S. Appl. No. 16/083,819, filed Sep. 10, 2018, Aurelien R. Hubert.
(Continued)

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

A camera may use a multi-axis image sensor shifting system to implement both autofocus (AF) and optical image stabilization (OSI) functions. The multi-axis image sensor shifting system may include a flexure suspension arrangement and an actuator. The flexure suspension arrangement may include an inner frame, an intermediate frame, and an outer frame. The actuator may include one or more magnets, and two sets of one or more coils attached respectively to some of the frames of the flexure suspension arrangement. Current flowing through the coils may be regulated to interact with the magnetic field of the magnets to generate motive force to move an image sensor of the camera relative to a lens group in multiple directions.

20 Claims, 7 Drawing Sheets

(56) References Cited

U.S. PATENT DOCUMENTS

| | | |
|---|---|---|
| 8,488,260 B2 | 7/2013 | Calvet et al. |
| 8,548,313 B2 | 10/2013 | Krueger |
| 8,749,643 B2 | 6/2014 | Lim et al. |
| 8,866,918 B2 | 10/2014 | Gregory et al. |
| 8,908,086 B2 | 12/2014 | Kawai |
| 8,947,544 B2 | 2/2015 | Kawai |
| 8,998,514 B2 | 4/2015 | Gutierrez et al. |
| 9,298,017 B2 | 3/2016 | Sugawara et al. |
| 9,578,217 B2 | 2/2017 | Gutierrez et al. |
| 9,632,280 B2 | 4/2017 | Yeo |
| 9,736,345 B1 | 8/2017 | Topliss et al. |
| 9,807,305 B2 | 10/2017 | Guitierrez |
| 10,257,433 B2 | 4/2019 | Eromaki |
| 10,863,094 B2 | 12/2020 | Sharma et al. |
| 10,890,734 B1 | 1/2021 | Sharma et al. |
| 10,924,675 B2 | 2/2021 | Hubert et al. |
| 11,122,205 B1 | 9/2021 | Sharma |
| 11,223,766 B2 | 1/2022 | Sharma et al. |
| 2001/0001588 A1 | 5/2001 | Matz |
| 2003/0184878 A1 | 10/2003 | Tsuzuki |
| 2006/0017815 A1 | 1/2006 | Stavely et al. |
| 2007/0279497 A1 | 12/2007 | Wada et al. |
| 2009/0147340 A1 | 6/2009 | Lipton |
| 2009/0295986 A1 | 12/2009 | Topliss et al. |
| 2010/0165131 A1 | 7/2010 | Makimoto et al. |
| 2011/0141294 A1 | 6/2011 | Lam |
| 2011/0235194 A1 | 9/2011 | Nobe |
| 2012/0106936 A1 | 5/2012 | Lim et al. |
| 2012/0120512 A1 | 5/2012 | Wade et al. |
| 2012/0224075 A1 | 9/2012 | Lim |
| 2012/0268642 A1 | 10/2012 | Kawai |
| 2013/0107068 A1 | 5/2013 | Kim et al. |
| 2013/0119785 A1 | 5/2013 | Han |
| 2013/0250169 A1 | 9/2013 | Kim et al. |
| 2014/0009631 A1* | 1/2014 | Topliss ................. H04N 5/2257 348/208.11 |
| 2014/0139695 A1 | 5/2014 | Kawai |
| 2014/0255016 A1 | 9/2014 | Kim et al. |
| 2014/0327965 A1 | 11/2014 | Chen |
| 2015/0051097 A1 | 2/2015 | Anderton et al. |
| 2015/0135703 A1 | 5/2015 | Eddington et al. |
| 2015/0195439 A1 | 7/2015 | Miller et al. |
| 2015/0350499 A1 | 12/2015 | Topliss |
| 2015/0358528 A1 | 12/2015 | Brodie et al. |
| 2016/0041363 A1 | 2/2016 | Hagiwara |
| 2016/0070115 A1 | 3/2016 | Miller et al. |
| 2016/0072998 A1 | 3/2016 | Yazawa |
| 2016/0073028 A1 | 3/2016 | Gleason et al. |
| 2016/0154204 A1 | 6/2016 | Lim et al. |
| 2016/0161828 A1 | 6/2016 | Lee |
| 2016/0097937 A1 | 7/2016 | Lam |
| 2016/0209672 A1 | 7/2016 | Park et al. |
| 2016/0360111 A1 | 12/2016 | Thivent et al. |
| 2017/0054883 A1 | 2/2017 | Sharma et al. |
| 2017/0082829 A1 | 3/2017 | Kudo et al. |
| 2017/0155816 A1 | 6/2017 | Ito et al. |
| 2017/0285362 A1 | 10/2017 | Hu et al. |
| 2017/0324906 A1 | 11/2017 | Kang et al. |
| 2017/0351158 A1 | 12/2017 | Kudo |
| 2018/0041668 A1 | 2/2018 | Cui |
| 2018/0048793 A1 | 2/2018 | Gross et al. |
| 2018/0171991 A1 | 6/2018 | Miller et al. |
| 2018/0173080 A1 | 6/2018 | Enta |
| 2019/0014258 A1 | 1/2019 | Horesh |
| 2019/0141248 A1* | 5/2019 | Hubert ............... H04N 5/23287 |
| 2021/0132327 A1 | 5/2021 | Sharma et al. |
| 2021/0168289 A1 | 6/2021 | Hubert et al. |
| 2021/0223563 A1* | 7/2021 | Miller ..................... G03B 3/10 |
| 2021/0409604 A1 | 12/2021 | Sharma et al. |
| 2022/0124249 A1 | 4/2022 | Sharma et al. |

FOREIGN PATENT DOCUMENTS

| | | |
|---|---|---|
| CN | 102749697 | 10/2012 |
| CN | 103117637 | 5/2013 |
| CN | 104767915 | 7/2015 |
| CN | 10502204 | 11/2015 |
| CN | 105025657 | 11/2015 |
| CN | 204903924 | 12/2015 |
| CN | 105573014 | 5/2016 |
| CN | 105652557 A | 6/2016 |
| CN | 105807537 A | 7/2016 |
| CN | 106291862 | 1/2017 |
| CN | 106470303 | 3/2017 |
| JP | H10285475 A | 10/1998 |
| JP | 2008203402 A | 9/2008 |
| JP | 2011154403 | 8/2011 |
| JP | 2011203476 | 10/2011 |
| JP | 2013072967 A | 4/2013 |
| JP | 2013125080 A | 6/2013 |
| JP | 2015146040 | 8/2015 |
| JP | 2016028299 | 2/2016 |
| KR | 20100048361 | 5/2010 |
| KR | 20150051097 | 5/2015 |
| TW | 201114249 | 4/2011 |
| TW | 201418863 | 5/2014 |
| TW | I438543 | 5/2014 |
| WO | 2020069391 | 4/2020 |

OTHER PUBLICATIONS

U.S. Appl. No. 15/940,661, filed Mar. 29, 2018, Shashank Sharma.
U.S. Appl. No. 16/036,838, filed Jul. 16, 2018, Shashank Sharma.
U.S. Appl. No. 17/472,427, filed Sep. 10, 2021, Shashank Sharma.
U.S. Appl. No. 17/112,411, filed Dec. 4, 2020, Shashank Sharma.
U.S. Appl. No. 17/145,100, filed Jan. 8, 2021, Shashank Sharma.
U.S. Appl. No. 17/719,287, filed Apr. 12, 2022, Seyed Mohammad Javid Mahmoudzadeh.

* cited by examiner

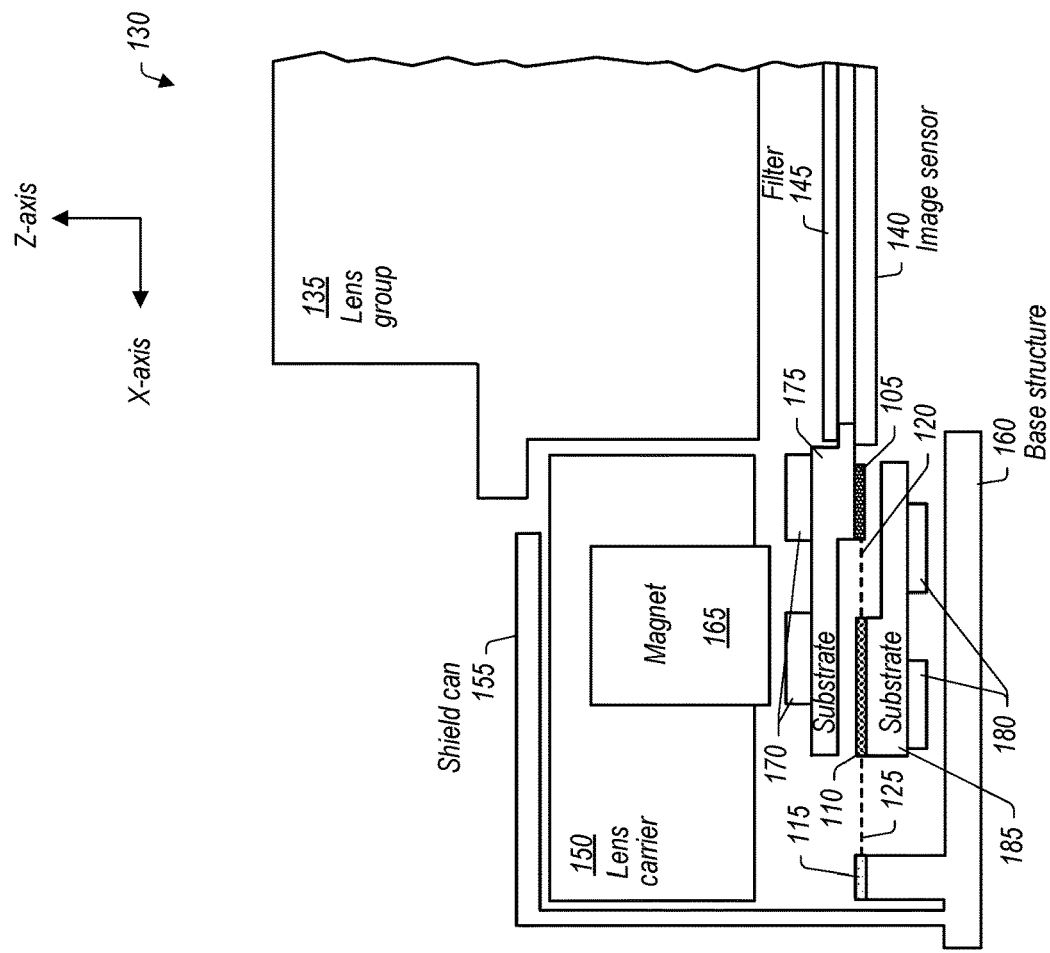
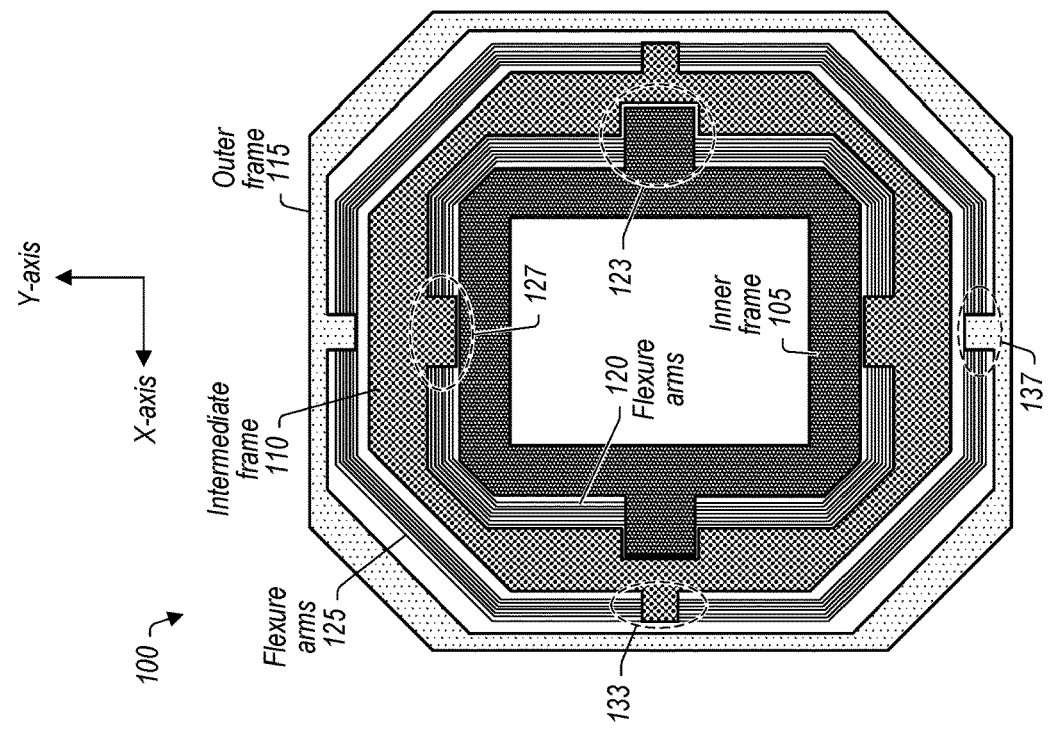
FIG. 1B
FIG. 1A

MULTI-AXIS IMAGE SENSOR SHIFTING SYSTEM

This application claims benefit of priority of U.S. Provisional Application Ser. No. 63/082,989, entitled "Multi-Axis Image Sensor Shifting System", filed Sep. 24, 2020, which is hereby incorporated in reference herein in its entirety.

BACKGROUND

Technical Field

This disclosure relates generally to a camera and more specifically to a camera having a multi-axis image sensor shifting system.

Description of the Related Art

Some cameras may include autofocus (AF) and optical image stabilization (OIS) functions. The AF function is to adjust the object focal distance to focus an object plane in front of a camera at an image plane to be captured by an image sensor. The OIS function is to sense and react to external excitation/disturbance by adjusting the position between the image sensor and optical lens(es) of the camera. The AF and OIS functions may be implemented by two separate systems. The AF system may move the optical lens(es) as a single rigid body relative to the image sensor (e.g., along Z-axis), whilst the OIS system may move the image sensor relative to the optical lens(es) (e.g., along X-axis or Y-axis). The advent of mobile multipurpose devices such as smartphones, tablet, or pad devices has resulted in a need for high-quality cameras to be integrated in the devices. Therefore, it is desirable to have one single multi-axis image sensor shifting system capable of implementing both AF and OIS functions for cameras.

BRIEF DESCRIPTION OF THE DRAWINGS

FIG. 1A shows an example flexure suspension arrangement of a multi-axis image sensor shifting system, according to some embodiments.

FIG. 1B shows an example camera including a multi-axis image sensor shifting system, according to some embodiments.

Figure 1C:
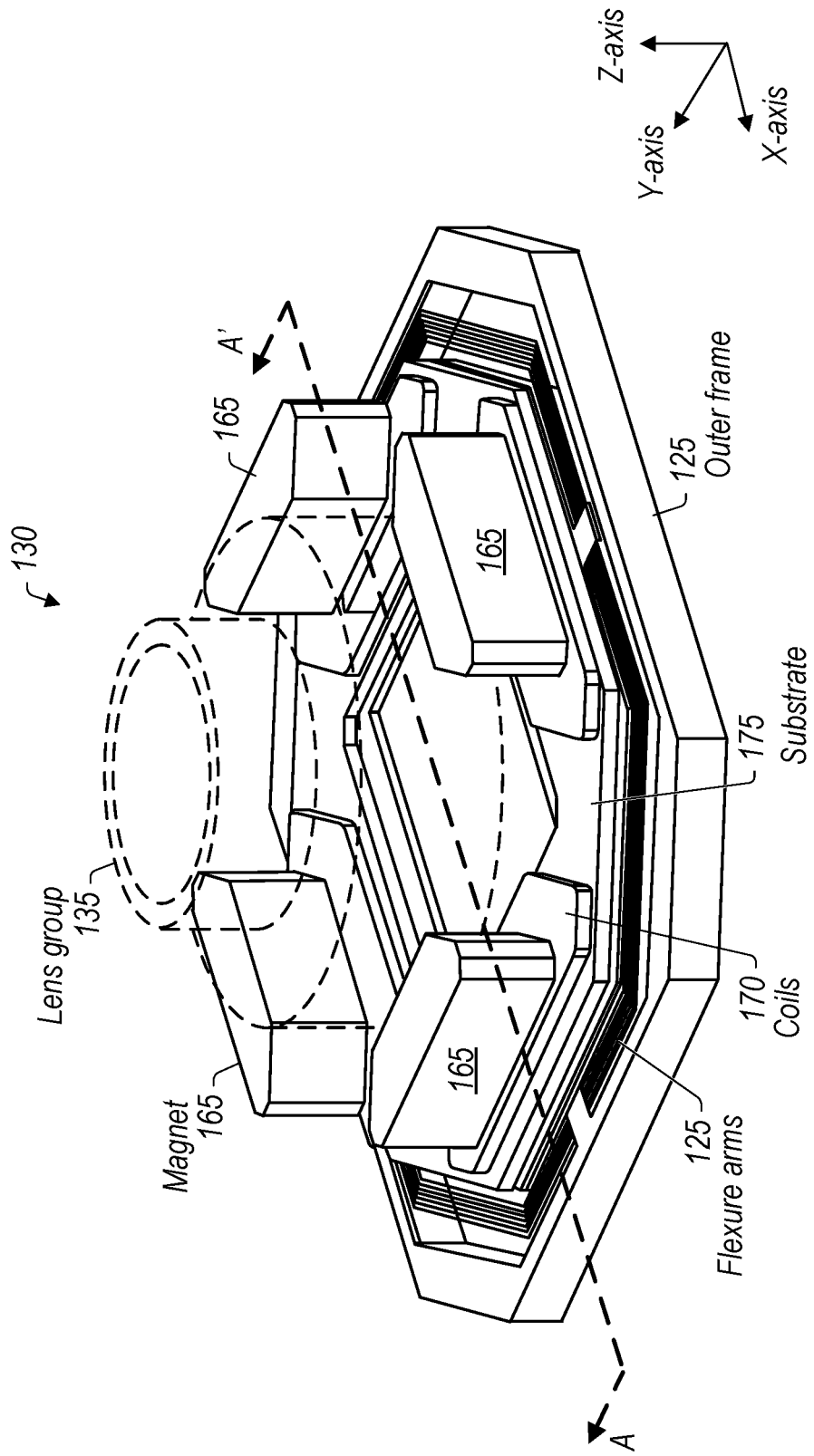
FIG. 1C shows an example perspective view of some components of a camera including a multi-axis image sensor shifting system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the"

are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera having a multi-axis image sensor shifting system. In some embodiments, the camera may include a lens group, an image sensor, and the multi-axis image sensor shifting system. In some embodiments, the lens group may include one or more lens elements which may define an optical axis (or Z-axis). In some embodiments, using the multi-image sensor shifting system, the camera may move the image sensor relative to the lens group in multiple directions, e.g., one direction approximately parallel to the optical axis (or Z-axis), and at least one more direction (e.g., along X-axis and/or Y-axis) approximately orthogonal to the optical axis (or Z-axis).

In some embodiments, the multi-axis image sensor shifting system may include a flexure suspension arrangement and an actuator. In some embodiments, the flexure suspension arrangement may include an inner frame, an intermediate frame, and an outer frame. In some embodiments, the inner frame may be flexibly coupled with the intermediate frame via a first set of flexure arms, and the intermediate frame may be further flexibly coupled with the outer frame via a second set of flexure arms. In some embodiments, the first and second sets of flexure arms may possess certain levels of mechanical flexibility, thus allowing some of the inner, intermediate, and outer frames to move relative to other frames. In addition, in some embodiments, some of the frames and/or corresponding flexure arms may have different stiffness in different directions. For instance, the inner frame and/or the first set of flexure arms may have less stiffness in the optical axis (or Z-axis) than X-axis and/or Y-axis, whilst the intermediate frame and/or the second set of flexure arms may have less stiffness in X-axis and/or Y-axis than the optical axis (or Z-axis). The different stiffness may add certain restriction to motion of the individual frames. For instance, in the above example, the inner frame may be restricted to move primarily along the optical axis (or Z-axis) given the less stiffness in Z-axis, whilst the intermediate frame may move primarily along X-axis and/or Y-axis. In addition, due to the difference in the stiffness, in some embodiments, the motion of one frame in one direction may also drag and force the other one or two frames to move together in the same direction.

In some embodiments, the actuator may include a voice coil motor (VCM) actuator. In some embodiments, the actuator may include one set of one or more magnets, a first set of one or more coils, and a second set of one or more coils. In some embodiments, the first set of coils may be attached to a first substrate, which may be further fixedly coupled with the image sensor and one of the frames (e.g., inner frame) of the flexure suspension arrangement. In some embodiments, the second set of coils may be attached to a second substrate, which may be further fixedly coupled with another frame (e.g., intermediate frame) of the flexure suspension arrangement. In some embodiments, the remaining frame (e.g., outer frame) of the flexure suspension arrangement may be fixedly coupled with a stationary, base structure of the camera. In some embodiments, individual coils of the first and second sets may be positioned proximate to their respective ones of the magnets, such that current flowing through the coils may electromagnetically interact with the magnetic fields of the corresponding magnets to create motive force (e.g., Lorentz force) upon the respective coils. Depending on the layout of the magnets and coils, the motive force may be created in different directions for coils in the first and second sets. For instance, the first set of coils may see motive force primarily in a direction approximately parallel to the optical axis (or Z-axis)—thus moving the inner frame (and fixedly coupled image sensor) along the optical axis (or Z-axis) relative to the lens group to implement various AF functions. By comparison, the second set of coils may experience motive force primarily in at least another direction (e.g., along X-axis and/or Y-axis) approximately orthogonal to the optical axis (or Z-axis)—thus moving the intermediate frame (and dragging inner frame and image sensor to move together) along X-axis and/or Y-axis relative to the lens group to implement various OIS functions. Therefore, with the one single multi-axis image sensor shifting system, the camera may move the image sensor relative to the lens group in multiple axes to perform both AF and OIS functions.

The disclosed multi-axis image sensor shifting system may eliminate the need to move the lens group (e.g., in order to perform the AF function) and may instead move only an image sensor. The lens group is generally much heavier than the image sensor. Therefore, this can significantly reduce the moving mass. The reduction of the moving mass can improve reliability. Further, this can lower power requirement for the actuator and/or battery of the camera, and reduce the size of the actuator and/or battery. Consequently, this may shrink the size of the camera, which can be critical for integration of the camera in small form factor, mobile multipurpose devices.

FIG. 1A shows an example flexure suspension arrangement of a multi-axis image sensor shifting system, according to some embodiments. FIG. 1B shows an example camera including the multi-axis image sensor shifting system, according to some embodiments. For purposes of illustration, FIGS. 1A-1B are described together herein with reference to each other. FIG. 1A shows a top view (e.g., in X-Y plane) of flexure suspension arrangement 100. In this example, in some embodiments, flexure suspension arrangement 100 may include inner frame 105, intermediate frame 110, and outer frame 115. In some embodiments, inner frame 105 may be flexibly coupled with intermediate frame 110 via a first set of flexure arms 120. For instance, individual ones of the first set of flexure arms 120 may connect to respective protruding portions 123 (of inner frame 105) and 127 (of intermediate frame 110). In some embodiments, intermediate frame 110 may be flexibly coupled with outer frame 115 via a second set of flexure arms 125. For instance, individual ones of the second set of flexure arms 125 may connect to respective protruding portions 133 (of intermediate frame 110) and 137 (of outer frame 115). In some embodiments, individual flexure arms 120 and 125 of the first and second sets may possess certain levels of mechanical flexibility, such that individual flexure arms 120 and 125 may be able to stretch or bend in certain direction(s). Such mechanical flexibility may allow some of the frames 105, 110, and 115 to be able to move relative to other frames. For instance, assuming outer frame 115 to be a stationary reference point, intermediate frame 110 may move relative to outer frame 115 via the second set of flexure arms 125, and inner frame 105 may move relative to outer frame 115 via the first set of flexure arms 120. For purposes of illustration, in this disclosure, inner frame 105, intermediate frame 110, and the first set of flexure arms 120 may together be called a first flexure, whilst outer frame 115 and the second set of flexure arms 125 may together be called a second flexure.

In addition, in some embodiments, individual flexure arms 120/125 and/or some of the frames 105/110/115 may use various materials (e.g., various metal materials), and/or may have various shapes and/or sizes, such that individual flexure arms 120/125 and/or some of the frames 105/110/115 may have different stiffness in different directions. For instance, inner frame 105 and/or the first set of flexure arms 120 may be designed to have less stiffness in Z-axis than X-axis or Y-axis, whilst intermediate frame 110 and/or the second set of flexure arms 125 may be designed to have less stiffness X-axis or Y-axis than Z-axis. The different stiffness, in combination with the mechanical flexibility, may restrict motion of some of the frames primarily in certain direction(s). In this example, inner frame 105 may primarily be able to move in Z-axis relative to outer frame 115 (which may be assumed as a stationary reference point), given the less stiffness in Z-axis. By comparison, intermediate frame 110 may primarily move in X-axis and/or Y-axis relative to outer frame 115, because of the less stiffness in X-axis and/or Y-axis. In addition, the motion of intermediate frame 110 may further drag and thus force inner frame 105 to move together in X-axis and/or Y-axis, given the stronger stiffness of inner frame 105 in X-axis and/or Y-axis. In some embodiments, suspension flexure arrangement 100 may be made from one single piece. For instance, they may all start with one single metal sheet, and one or more etching processes may be applied to the metal sheet to create inner frame 105, intermediate frame 110, outer frame 115, the first set of flexure arms 120, and the second set of flexure arms 125, which may have a same or different thickness and may be in various shapes and/or sizes. In some embodiments, suspension arrangement 100 may be created from several separate pieces. For instance, some of inner frame 105, intermediate frame 110, outer frame 115, the first set of flexure arms 120, and the second set of flexure arms 125 may be created separately from the other of the components, and then all the components may be joined together to form flexure suspension arrangement 100. In some embodiments, even one component (e.g., intermediate frame 110) may not necessarily be one single piece, but instead be formed using several separate pieces.

Now referring to FIG. 1B, this figure shows a cross-sectional review of (a partial portion of) camera 130, in the direction A-A' as indicated in FIG. 1C, which may include a multi-axis image sensor shifting system having flexure suspension arrangement 100, according to some embodiments. In this example, in some embodiments, camera 130 may include lens group 135 having one or more lens elements (not shown). In some embodiments, lens group 135 may define an optical axis, e.g., Z-axis passing through a geometric center of at least one of the one or more lens elements. In this example, light may pass through the one or more lens elements of lens group 135 (e.g., along the optical axis or Z-axis) to focus on to an image plane at image sensor 140, such that image sensor 140 may generate image data based on the light captured by the image sensor. In some embodiments, camera 130 may optionally include optical filter 145 (e.g., an infrared filter), which may filter or block at least some light (e.g., at least some infrared light) from reaching image sensor 140. In some embodiments, the one or more lens elements of lens group 135 may be fixedly coupled with lens carrier 150. For instance, lens carrier 150 may include interior threads, such that the one or more lens elements may be screwed in to lens carrier 150 via the threads from inside. In some embodiments, lens carrier 150 may be further fixedly coupled with shield can 155 of camera 130, which may also be attached to base structure 160. In other words, lens group 135, lens carrier 150, shield can 155, and base structure 160 may be viewed as one "combined" piece, since these components of camera 130 may be fixedly coupled altogether. For purposes of illustration, this combined piece (and any of these components) may be perceived as a stationary reference point for analysis of the motion of image sensor 140 in the multiple directions.

In some embodiments, the multi-axis image sensor shifting system may include an actuator, which may work together with flexure suspension arrangement 100 to move image sensor 140 relative to lens group 135 along multiple axes (e.g., Z-axis, and at least another axis such as X-axis and/or Y-axis). In some embodiments, the actuator may be a VCM actuator. In some embodiments, the actuator may include a set of magnets 165, which may be attached to lens carrier 150, as shown in FIG. 1B. In some embodiments, the actuator may further include a first set of coils 170, which may be attached to a first substrate 175. In some embodiments, image sensor 140 and optional optical filter 145 may be also fixedly coupled to the first substrate 175 (e.g., using chip sockets and/or soldering). In some embodiments, the first substrate 175 may be fixedly coupled with inner frame 105, as shown in FIG. 1B. In some embodiments, the actuator may further include a second set of coils 180, which may be attached to a second substrate 185. In some embodiments, the second substrate 185 may be fixedly coupled with intermediate frame 110, as shown in FIG. 1B. In some embodiments, outer frame 115 may be fixedly coupled with base structure 160, thus becoming one of the stationary reference points. Therefore, in this example, inner frame 105 and the first set of flexure arms 120 may suspend the first substrate 175 (and thus the first set of coils 170 and image sensor 140) from the second substrate 185, whilst intermediate frame 110 and the second set of flexure arms 125 may suspend the second substrate 185 (and thus the second set of coils 180) from base structure 160 (and outer frame 115), according to some embodiments. In combination with the description above with regards to FIG. 1A, in some embodiments, inner frame 105 (and image sensor 140) may thus be able to be moved relative to outer frame 115 (and thus lens group 135) in Z-axis—thus implementing various AF functions. In addition, in some embodiments, intermediate frame 110 may be able to be moved (and thus dragging inner frame 105 and image sensor 140 together) relative to outer frame 115 (and thus lens group 135) in X-axis and/or Y-axis—thus implementing various OIS functions. In summary, camera 130 may be able to use the one single multi-axis image sensor shifting system to perform both AF and OIS functions.

FIG. 1C shows an example perspective view of some components of camera 130, according to some embodiments. For instance, in this view, camera 130 may include the set of magnets 165 (e.g., four magnets arranged around an interior perimeter of camera 130), according to some embodiments. In some embodiments, the actuator of camera 130 may include the first set of coils 170 attached to the first substrate 175. For instance, as shown in FIG. 1C, individual ones of the first set of coils 170 may be wound underneath and around their respective, corresponding magnets 165. In addition, as shown in FIG. 1C, flexure suspension arrangement 100 may include outer frame 125 and the second set of flexure arms 125. For purposes of illustration, FIG. 1C only shows some components of camera 130, and at least some other components of camera 130 described above in FIGS. 1A-1B may not be visible and thus be not shown in FIG. 1C.

Figures 2A, 2B:
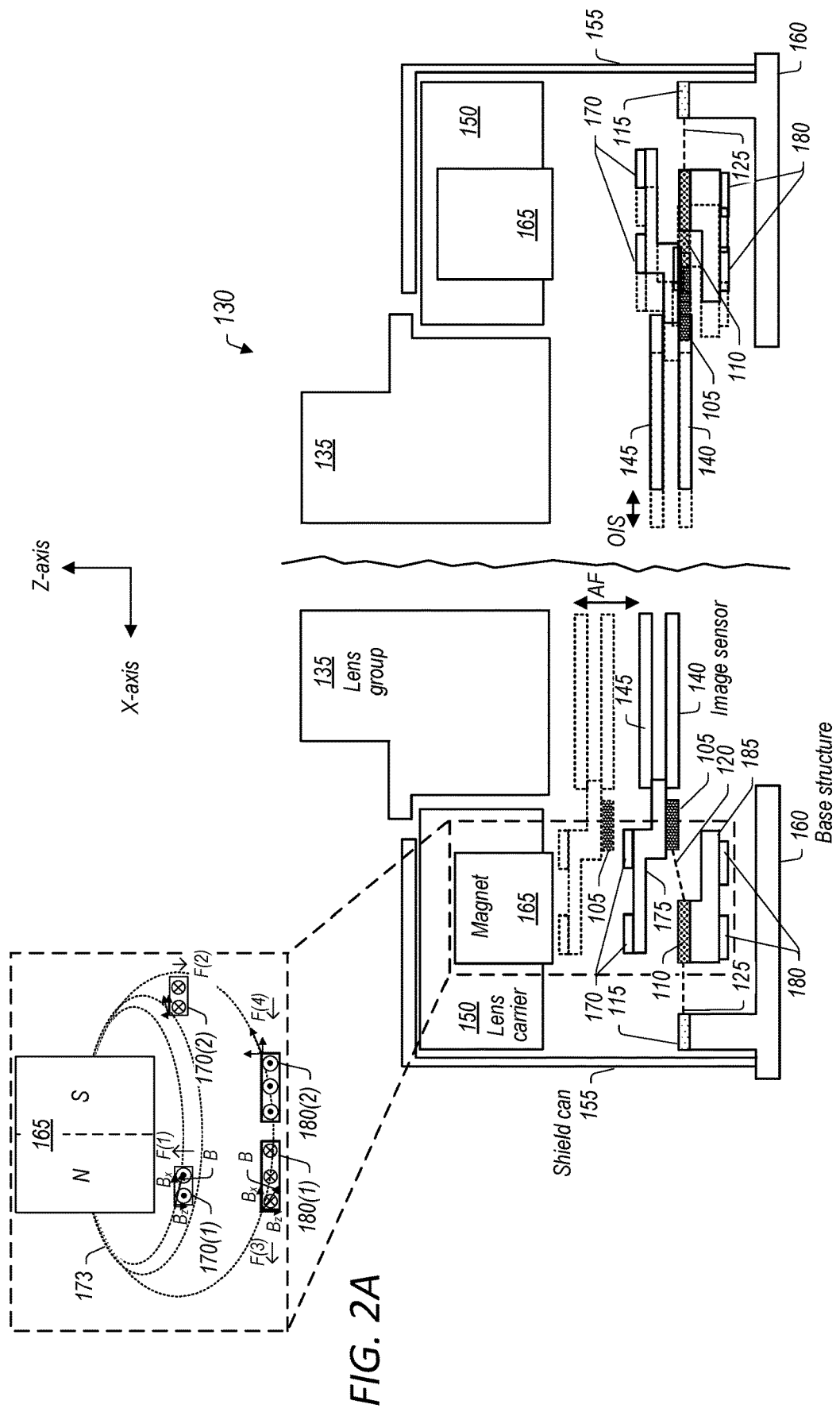
FIG. 2A is a schematic view to illustrate generation of motive force by example coils in different directions, according to some embodiments.
FIG. 2B shows example motion of an image sensor of a camera in multiple axes, according to some embodiments.

FIG. 2A is a schematic view to illustrate the generation of motive force by two sets of coils in different directions, whilst FIG. 2B shows example motion of an image sensor of a camera in multiple axes, according to some embodiments. For purposes of illustration, FIG. 2A shows only one coil 170 of the first set (attached to the first substrate 175), one coil 180 of the second set (attached to the second substrate 185), and one magnet 165. Operations described herein may also apply to other coils and the magnets. As shown in FIG. 2A, in some embodiments, coils 170 and 180 may be positioned proximate to magnet 165. In some embodiments, coils 170 and 180 may individually conduct current. For purposes of illustration, in FIG. 2A, crossing means the direction of the current flowing into the paper along Y-axis, whilst dot means the direction of the current flowing out of paper along Y-axis. In addition, Magnet 165 may generate magnet field the direction of which is indicated by dashed line 173 and symbol "B".

As for coil 170, the magnetic field B of magnet 165 may be decomposed into two magnetic components Bx and Bz in X-axis and Z-axis. In some embodiments, coil 170 may be placed in a position proximate magnet 165, such that coil 170 may primarily see the magnetic field in the direction along X-axis—i.e., seeing primarily the magnetic component Bx. Therefore, as illustrated in this example in FIG. 2A, Bx component is shown significantly larger (with a longer edge) than Bz component. In addition, in some embodiments, coil 170 may be shifted away from a center of magnet 165, such that the two portions of coil 170 (e.g., 170(1) and 170(2)) may see different magnetic field intensity. For instance, in this example, the first portion 170(1) may have a larger Bx component (and Bz component) than the second portion 170(2), because with the offset the first portion 170(1) may become closer to magnet 165 than the second portion 170(2). The current flowing through coil 170 can interact with the magnetic field of magnet 165 to generate motive force (e.g., Lorentz force). In this example, the current in the first portion 170(1) may interact with its corresponding Bx component to generate motive force F(1) in the positive direction of Z-axis, whilst the current in the second portion 170(2) may interact with its corresponding Bx component to generate motive force F(2) in the negative direction of Z-axis, as shown in FIG. 2A. Further, because the Bx component of the first portion 170(1) is larger than the second portion 170(2), the total motive force $F_{170}$ (with the combination of F(1) and F(2)) upon coil 170 may be in the positive direction of Z-axis. Therefore, by adjusting the position and distance of the first and second portions 170(1) and 170(2) with respect to magnet 165, the total motive force $F_{170}$ may be optimized in the desired direction. In addition, the geometric shape of magnet 165 may also affect the position and placing offset of coil 170 relative to magnet 165. As shown in FIG. 1C, in this example, magnet 165 may have an approximately trapezoidal shape from the perspective of coil 170. Therefore, the first portion 170(1) may be longer than the second portion 170(2). Together with different proximity to magnet 165, this may further enhance the difference between F(1) (upon the first portion 170(1)) than F(2) (upon the second portion 170(2)), and thus increase the total motive force $F_{170}$ in the positive direction of Z-axis. In some embodiments, by adjusting the geometrics of magnet 165, coil 170 may not necessarily be positioned with an offset from the center of magnet. Instead, coil 170 may be placed symmetrically around the center of magnet 165, but still provide the desired total motive force $F_{170}$. In some embodiments, the different portions of coil 170 (e.g., 170(1) and 170(2)) may have asymmetric shapes and/or sizes (e.g., different cross-sectional area) to provide a required offset.

Now referring to FIG. 2B, with reference to FIGS. 1A-1B, the first set of coils 170 may be attached to the first substrate 175, which may be further fixedly coupled with inner frame 105 and image sensor 140. Therefore, by regulating the value and direction of current flowing through coil 170, the motive force $F_{170}$ may be controlled. As a result, image sensor 140 may be controlled to move relative to lens group 135 in a direction approximately parallel to the optical axis (or Z-axis) of lens group 135. For instance, as shown in FIG. 2B, the motive force $F_{170}$ may stretch primarily the first set of flexure arms 120 (between inner frame 105 and intermediate frame 110) to move inner frame 105 (and image sensor 140) approximately along Z-axis, as indicated by edge "AF". Note that, the Bz component of the magnetic field of magnet 165 may also interact with the current of coil 170 to generate "parasitic" motive force. However, in this example, because Bz is significantly less than Bx, to simplify descriptions, this "parasitic" motive force is ignored. In some embodiments, effect of the "parasitic" motive force may be compensated for, e.g., by using one or more other coils (e.g., coils 180) because the "parasitic" motive force is in X-axis or Y-axis.

Referring back to FIG. 2A, as for coil 180, similarly, the magnetic field B of magnet 165 may be decomposed into two magnetic components Bx and Bz in X-axis and Z-axis. In some embodiments, coil 180 may be placed in a position proximate magnet 165, such that coil 180 may primarily see the magnetic field in the direction along Z-axis—i.e., seeing primarily the magnetic component Bz. Therefore, because the first portion of coil 180 (180(1)) is shown close to the north pole of magnet 165, whilst the second portion of coil 180 (180(2)) close to the south pole of magnet 165, the first portion 180(1) may primarily see a magnetic field in the negative direction of Z-axis, whilst the second portion 180(2) may primarily see a magnetic field in the positive direction of Z-axis, as shown in FIG. 2A. The current flowing through coil 180 can interact with the magnetic field of magnet 165 to generate motive force (e.g., Lorentz force). Given the direction of the current through portions 180(1) and 180(2), in this example, both the first and second portions 180(1) and 180(2) of coil 180 may be subject to motive force F(3) and F(4), respectively, in the positive direction of X-axis. As a result, the total motive force $F_{180}$ (with the combination of F(3) and F(4)) upon coil 180 may be in the positive direction of X-axis. In addition, because F(3) and F(4) on the different portions are both towards the same direction, the first and second portions 180(1) and 180(2) of coil 180 may not necessarily, although still possible, be placed with a placing offset with respect to magnet 165. For instance, as shown in FIG. 2A, the first and second portions 180(1) and 180(2) may be positioned symmetrically with respect to a center of magnet 165.

Referring to FIG. 2B, with reference to FIGS. 1A-1B, the second set of coils 180 may be attached to the second substrate 185d, which may be further fixedly coupled with intermediate frame 110. Therefore, by regulating the value and direction of current flowing through coil 180, the motive force $F_{180}$ may be controlled. As a result, intermediate frame may move (and also drag inner frame and image sensor 140) to move relative to lens group 135 in a direction (e.g., along X-axis) approximately orthogonal to the optical axis (or Z-axis) of lens group 135. For instance, as shown in FIG. 2B, the motive force $F_{180}$ may stretch primarily the second set of flexure arms 125 (between intermediate frame 110 and outer frame 115) to move intermediate frame 110 (and image sensor 140) approximately along X-axis, as indicated by edge "OIS". In addition, in some embodiments, by using the other coils of the second set of coils 180 (e.g., the one or two coil(s) 90° from coil 180 in FIG. 2A), intermediate frame 110 (and image sensor 140) may also move relative to lens group 135 approximately along Y-axis. Similarly, the Bx component of magnetic field of magnet 165 may also interact with the current of coil 180 to generate "parasitic" motive force. For purposes of illustration, this "parasitic" motive force is ignored in this disclosure. But in some embodiments, effect of the "parasitic" motive force may be compensated for, e.g., by using one or more other coils (e.g., coils 170) because the "parasitic" motive force is in Z-axis.

Figure 3A:
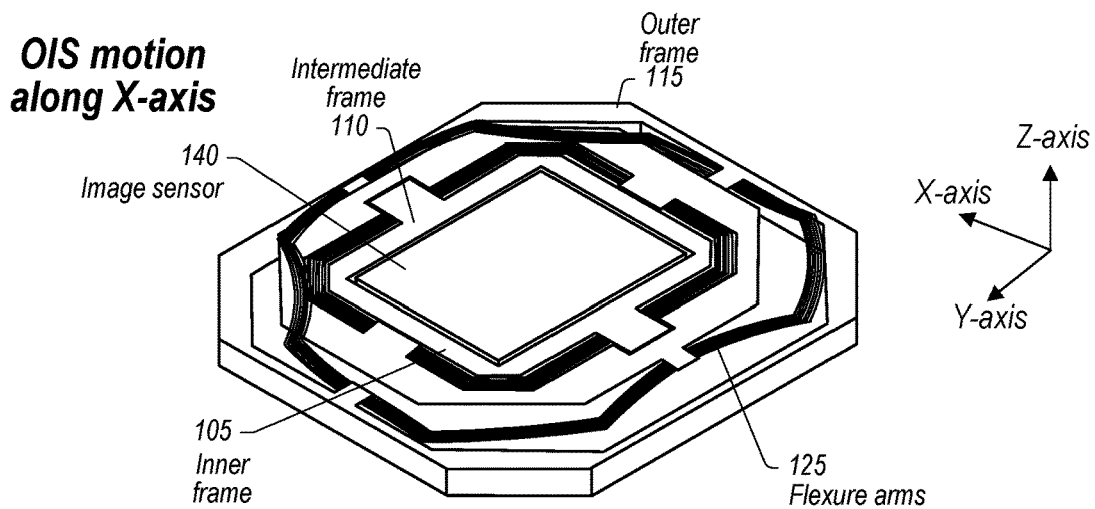
FIGS. 3A-3C show example motion of components of an example flexure suspension arrangement, according to some embodiments.
Figure 3B:
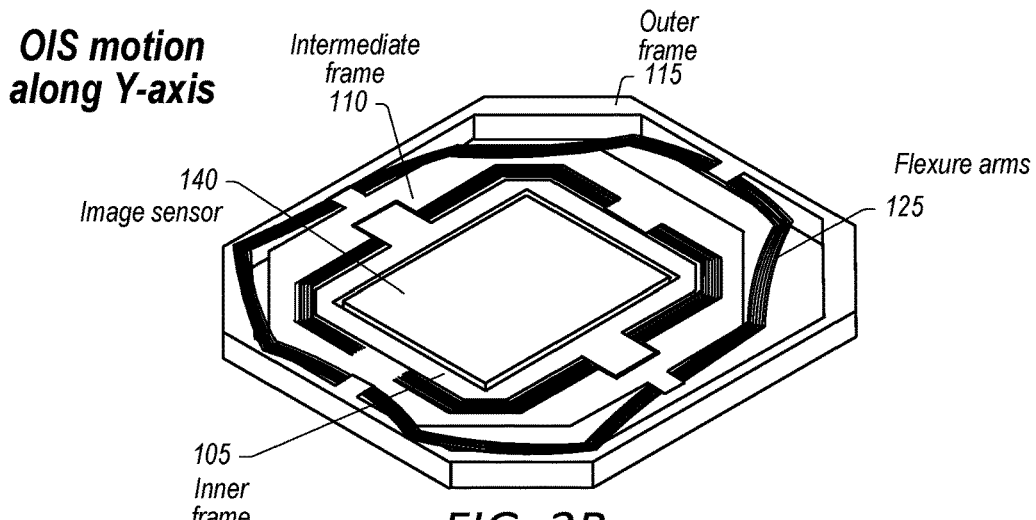
Figure 3C:
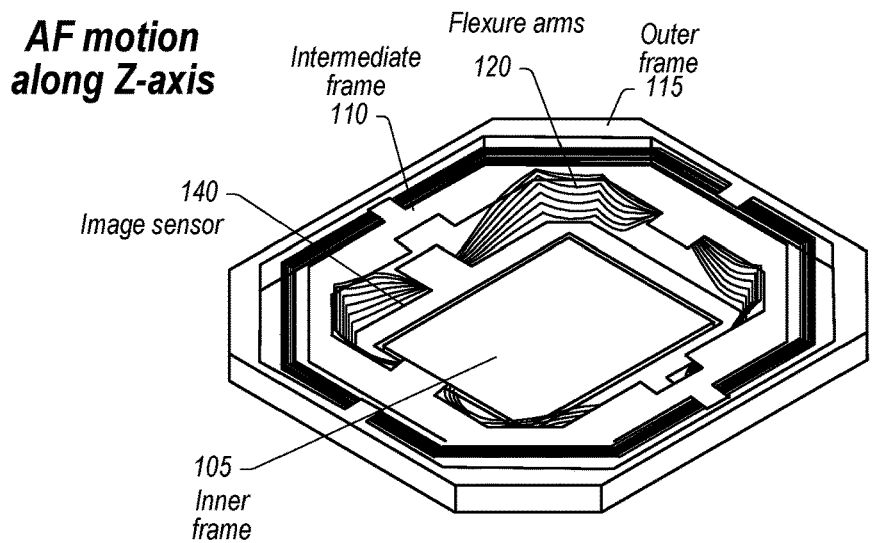

FIGS. 3A-3C show motion of components of an example flexure suspension arrangement, according to some embodiments. For instance, as shown in FIG. 3A, image sensor 140 may move in a direction (along X-axis) approximately orthogonal to Z-axis, by stretching the second set of flexure arms 125 between intermediate frame 110 and outer frame 115 toward the positive direction of X-axis, as described above in FIGS. 2A-2B. Similarly, in FIG. 3B, image sensor 140 may move in another direction (along Y-axis) approximately orthogonal to Z-axis, by stretching the second set of flexure arms 125 between intermediate frame 110 and outer frame 115 toward the positive direction of Y-axis. Finally, as shown FIG. 3C, image sensor 140 may move in a third direction approximately parallel to Z-axis, by stretching the first set of coils 120 between inner frame 105 and intermediate frame 110 toward the negative direction of Z-axis. In short, FIGS. 3A-3C illustrates that an image sensor of a camera may be moved in multiple directions (e.g., three directions approximately along X-axis, Y-axis, and Z-axis) relative to a lens group, using one single flexure suspension arrangement, to implement both AF and OIS functions.

Figure 4A:
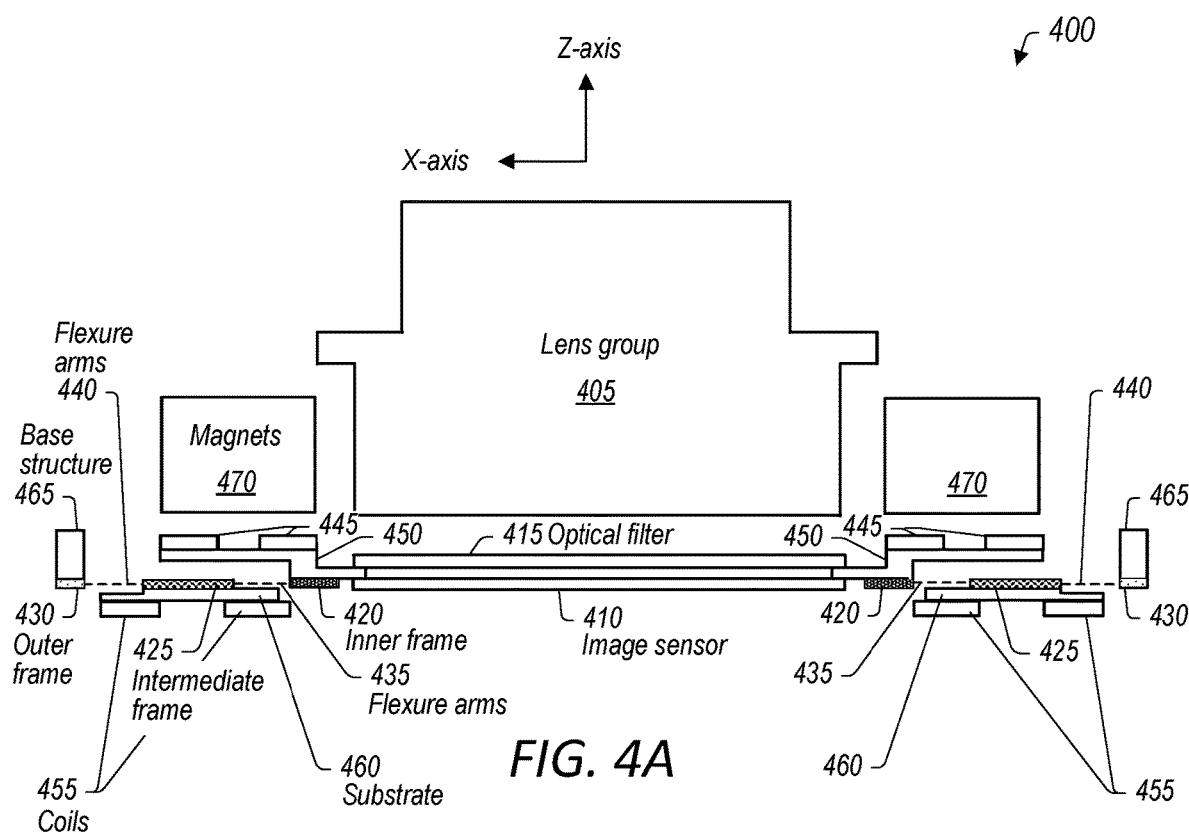
FIG. 4A-4B show another example camera having a multi-axis image sensor shifting system, according to some embodiments.
Figure 4B:
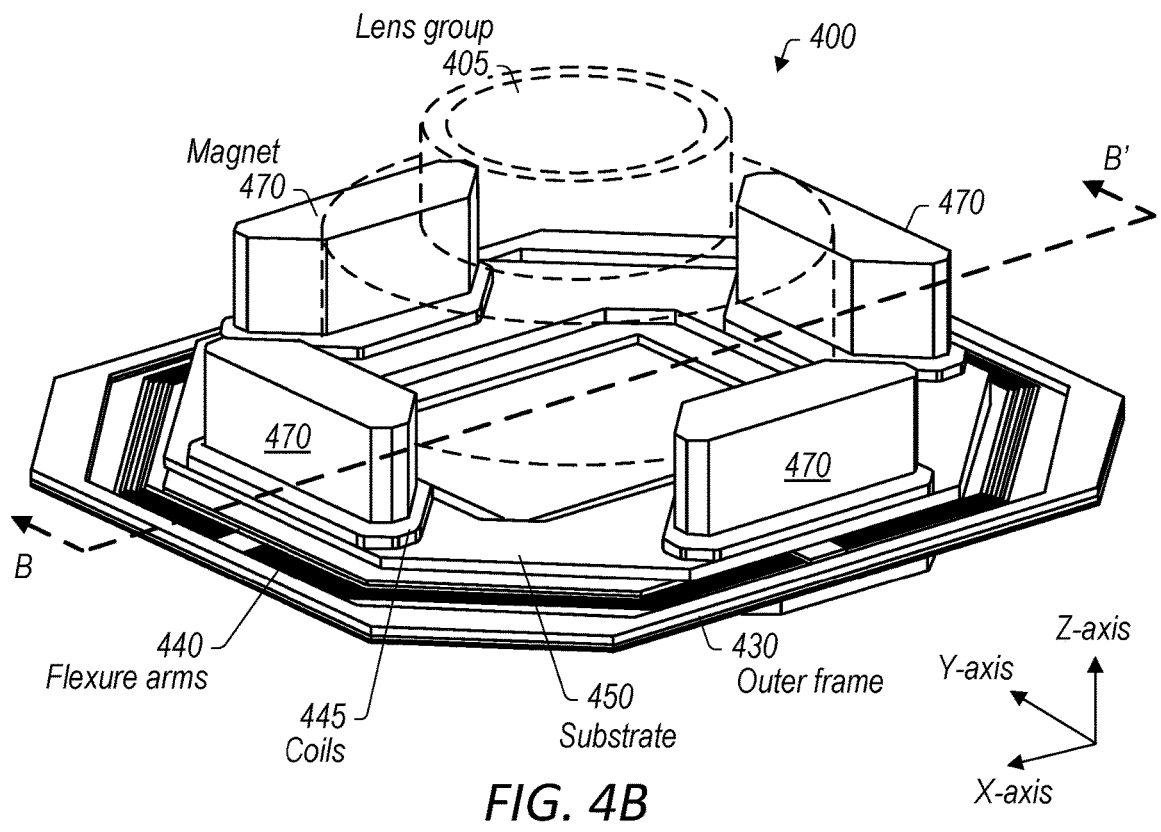

FIG. 4A-4B show another example camera having a multi-axis image sensor shifting system, according to some embodiments. For purposes of illustration, FIG. 4A shows only a simplified, cross-sectional view of camera 400 to illustrate some of the interior components of camera 400. Unlike camera 130 described above in FIGS. 1-3, in this example, camera 400 may use a set of coils arranged spatially at top (e.g., a first set of coils 445) to implement various OIS functions, and use another set of coils at bottom (e.g., a second set of coils 455) to implement various AF functions.

Referring to FIG. 4A, in some embodiments, camera 400 may include lens group 405 having one or more lens elements, image sensor 410, and a multi-axis image sensor shifting system. In some embodiments, camera 400 may optionally include optical filter 415 (e.g., an infrared filter) to filter or block at least some infrared light from reaching image sensor 410. In some embodiments, the multi-axis image sensor shifting system may include a flexure suspension arrangement, similar to flexure suspension arrangement 100 in FIGS. 1-3. For instance, the multi-axis image sensor shifting system of camera 400 may include inner frame 420, intermediate frame 425, and outer frame 430. In some embodiments, inner frame 420 may be flexibly coupled with intermediate frame 425 via a first set of flexure arms 435, whilst intermediate frame 425 may be flexibly coupled with outer frame 320 via a second set of flexure arms 440. In some embodiments, inner frame 420 and/or the first set of flexure arms 435 may be designed to have less stiffness in X-axis or Y-axis than Z-axis, such that inner frame 420 may move primarily in a direction (e.g., along X-axis and/or Y-axis) approximately orthogonal to the optical axis (or Z-axis) of lens group 405. In some embodiments, intermediate frame 425 and/or the second set of flexure arms 440 may have less stiffness in Z-axis than X-axis or Y-axis. Accordingly, intermediate frame 425 may move primarily in a direction approximately parallel to the optical axis (or Z-axis) of lens group 405. In addition, the motion of intermediate frame 425 may also drag and force inner frame 420 to move altogether in the same direction.

In some embodiments, the multi-axis image sensor shifting system of camera 400 may further include an actuator. In some embodiments, the actuator may include a VCM actuator. In some embodiments, the actuator may include a first set of coils a first set of coils 445, which may be attached to a first substrate 450. In some embodiments, image sensor 410 and optional optical filter 415 may be also fixedly coupled to the first substrate 450 (e.g., using chip sockets and/or soldering). In some embodiments, the first substrate 450 may be fixedly coupled with inner frame 420, as shown in FIG. 4A. In some embodiments, the actuator may further include a second set of coils 455, which may be attached to a second substrate 460. In some embodiments, the second substrate 460 may be fixedly coupled with intermediate frame 425, as shown in FIG. 4A. In some embodiments, outer frame 430 may be fixedly coupled with a stationary, base structure 465 of camera 400. In some embodiments, individual ones of the first and second set of coils 445 and 455 may be positioned proximate their corresponding magnets 470. Therefore, in this example, inner frame 420 and the first set of flexure arms 435 may suspend the first substrate 450 (and thus the first set of coils 445 and image sensor 410) from the second substrate 460, whilst intermediate frame 425 and the second set of flexure arms 440 may suspend the second substrate 460 (and thus the second set of coils 180) from base structure 465 (and outer frame 430), according to some embodiments. As described above with regards to FIGS. 2A-2B, camera 400 may regulate current flowing through the first set of coils 445 to thus move inner frame 420 (and image sensor 410), e.g., by stretching primarily the first set of flexure arms 435 between intermediate frame 425 and inner frame 420, relative to lens group 405 in a direction (e.g., along X-axis and/or Y-axis) approximately orthogonal to the optical axis (or Z-axis) of lens group 405—thus implementing various OIS functions. In addition, in some embodiments, camera 400 may regulate current flowing through the second set of coils 455 to move intermediate frame 425 (and thus drag and move inner frame 420 and image sensor 410), by stretching primarily the second set of coils 440 between intermediate frame 425 and outer frame 320, relative to lens group 405 in a direction approximately parallel to the optical axis (or Z-axis) of lens group 405—thus implementing various AF functions.

FIG. 4B shows an example perspective view of some components of camera 400, according to some embodiments. For instance, in this view, camera 400 may include the set of magnets 470 (e.g., four magnets arranged around an interior perimeter of camera 400), according to some embodiments. In some embodiments, the actuator of camera 400 may include the first set of coils 445 attached to the first substrate 450. Unlike FIGS. 1-3, in this example, the first set of coils 445 used to implement OIS functions may be arranged spatially above the second set of coils 455 and thus become visible in FIG. 4B. As shown in FIG. 4B, individual ones of the first set of coils 445 may be wound underneath and around their respective, corresponding magnets 470. In addition, as shown in FIG. 4B, outer frame 430 and the second set of flexure arms 440 of the flexure suspension arrangement may also be visible.

Figure 5:
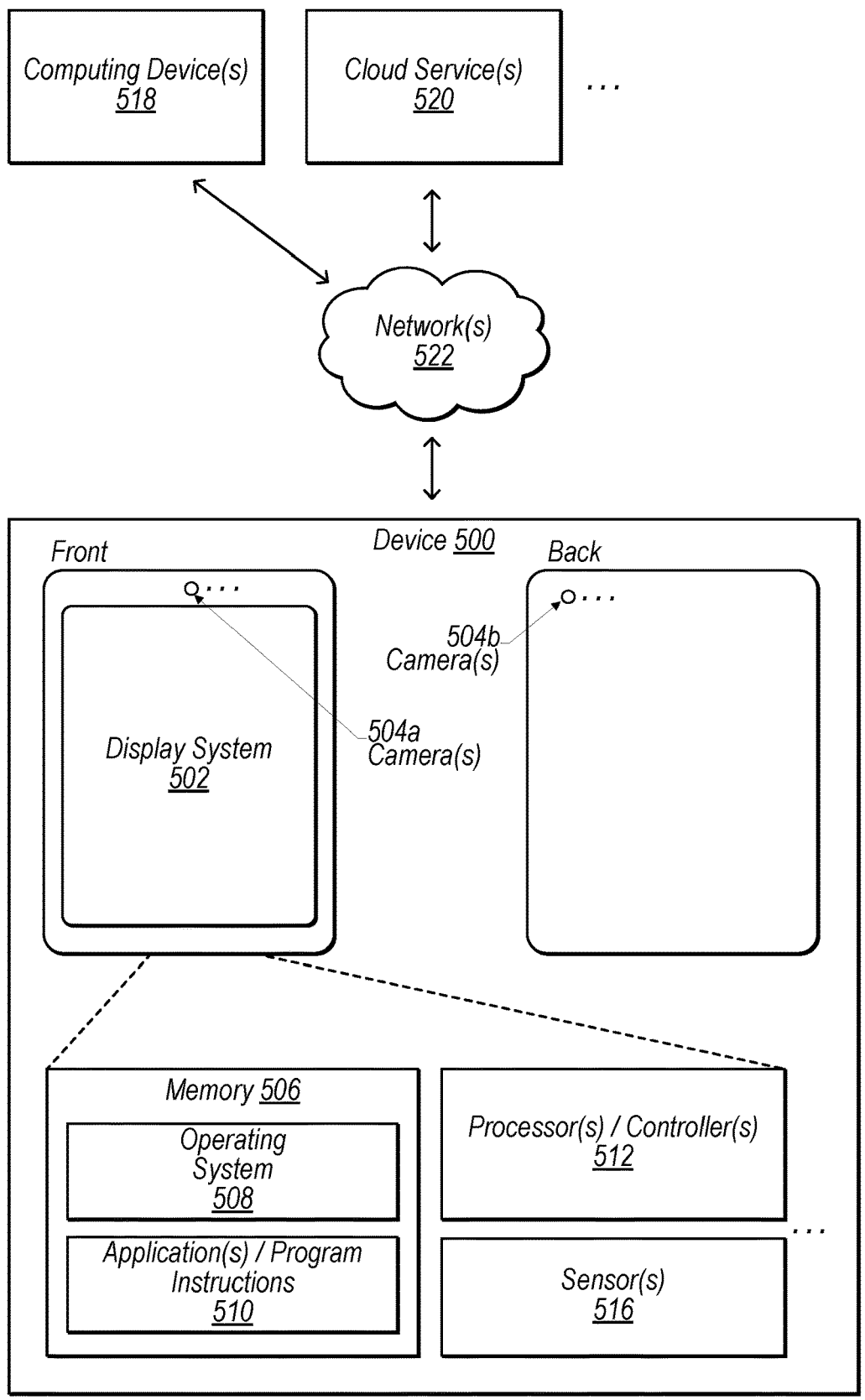
FIG. 5 illustrates a schematic representation of an example device that may include a camera having a multi-axis image sensor shifting system, according to some embodiments.

FIG. 5 illustrates a schematic representation of an example device 500 that may include a camera (e.g., the camera described above in FIGS. 1-4) having a multi-axis image sensor shifting system, e.g., as described herein with reference to FIGS. 1-4, according to some embodiments. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
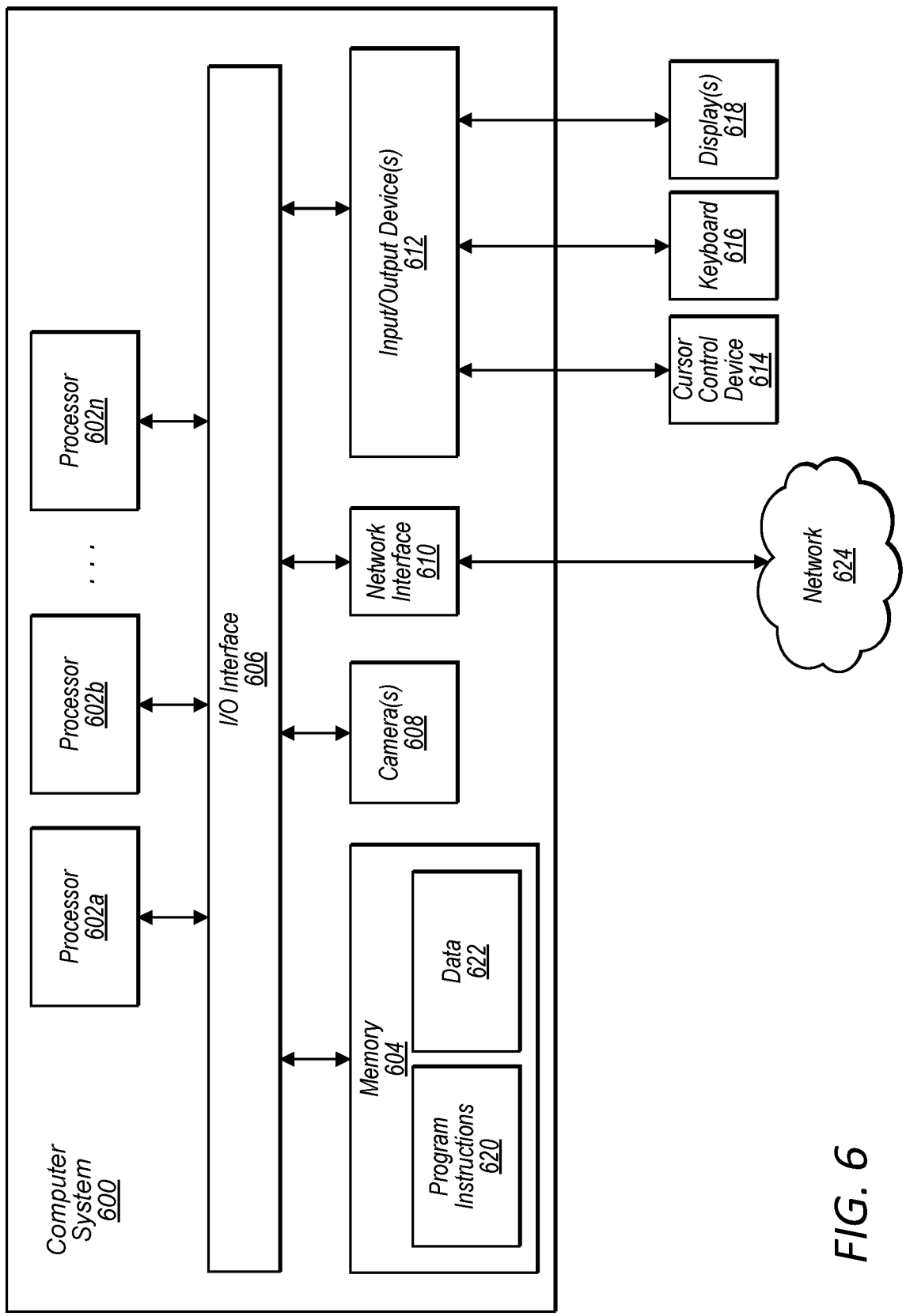
FIG. 6 illustrates a schematic block diagram of an example computer system that may include a camera having a multi-axis image sensor shifting system, according to some embodiments.

FIG. 6 illustrates a schematic block diagram of an example computing device, referred to as computer system 600, that may include or host embodiments of a camera having a multi-axis image sensor shifting system, e.g., as described herein with reference to FIGS. 1-5, according to some embodiments. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. In multiprocessor systems, each of processors 602 may commonly, but not necessarily, implement the same ISA.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements that define an optical axis;
   an image sensor;
   a base structure;
   a first substrate fixedly coupled with the image sensor, such that the image sensor moves together with the first substrate;
   a second substrate;

a voice coil motor (VCM) actuator, comprising:
  a magnet attached to a stationary structure of the camera;
  a first coil attached to the first substrate; and
  a second coil attached to the second substrate;
  wherein the first coil and the second coil are positioned proximate the magnet such that the first coil and the second coil are capable of electromagnetically interacting with the magnet to produce Lorentz forces that move the image sensor in multiple directions relative to the lens group; and
a flexure suspension arrangement for suspending the image sensor from the base structure, comprising:
  a first flexure for suspending the first substrate from the second substrate, wherein the first flexure comprises a first set of one or more flexure arms that allow the first substrate to move, together with the image sensor, in at least a first direction relative to the lens group; and
  a second flexure for suspending the second substrate from the base structure, wherein the second flexure comprises a second set of one or more flexure arms that allow the second substrate to move, together with the first substrate, in at least a second direction orthogonal to the first direction.

2. The camera of claim 1, wherein:
the first coil is an autofocus (AF) coil that, when supplied with an AF drive current, interacts with the magnet to move the image sensor in at least one direction parallel to the optical axis, to provide AF movement of an image on the image sensor; and
the second coil is an optical image stabilization (OIS) coil that, when supplied with an OIS drive current, interacts with the magnet to move the image sensor in at least one direction orthogonal to the optical axis, to provide OIS movement of the image on the image sensor.

3. The camera of claim 2, wherein:
the first set of one or more flexure arms are configured to allow the first substrate to move, together with the image sensor and relative to the second substrate, in the at least one direction parallel to the optical axis; and
the second set of one or more flexure arms are configured to allow the second substrate to move, together with the first substrate, in the at least one direction orthogonal to the optical axis.

4. The camera of claim 1, wherein:
the first coil is an optical image stabilization (OIS) coil that, when supplied with an OIS drive current, interacts with the magnet to move the image sensor in at least one direction orthogonal to the optical axis, to provide OIS movement of an image on the image sensor; and
the second coil is an autofocus (AF) coil that, when supplied with an AF drive current, interacts with the magnet to move the image sensor in at least one direction parallel to the optical axis, to provide AF movement of the image on the image sensor.

5. The camera of claim 4, wherein:
the first set of one or more flexure arms are configured to allow the first substrate to move, together with the image sensor, in the at least one direction orthogonal to the optical axis; and
the second set of one or more flexure arms are configured to allow the second substrate to move, together with the first substrate, in the at least one direction parallel to the optical axis.

6. The camera of claim 1, wherein the first coil is positioned, in a direction parallel to the optical axis, between the magnet and the second coil.

7. The camera of claim 1, wherein
the flexure suspension arrangement further comprises:
  an inner frame attached to the first substrate;
  an intermediate frame attached to the second substrate; and
  an outer frame attached to the base structure;
the first set of one or more flexure arms connect the inner frame to the intermediate frame; and
the second set of one or more flexure arms connect the intermediate frame to the outer frame.

8. The camera of claim 7, wherein:
the first flexure comprises:
  the inner frame;
  the first set of one or more flexure arms; and
  the intermediate frame; and
the second flexure comprises:
  the second set of one or more flexure arms; and
  the outer frame.

9. The camera of claim 8, wherein the first flexure and the second flexure are formed from a same sheet of material.

10. A device, comprising:
one or more processors;
memory storing program instructions executable by the one or more processors to control operations of a camera; and
the camera, comprising:
  a lens group comprising one or more lens elements that define an optical axis;
  an image sensor;
  a first substrate fixedly coupled with the image sensor, such that the image sensor moves together with the first substrate;
  a second substrate;
  a voice coil motor (VCM) actuator, comprising:
    a magnet attached to a stationary structure of the camera;
    a first coil attached to the first substrate; and
    a second coil attached to the second substrate;
    wherein the first coil and the second coil are positioned proximate the magnet such that the first coil and the second coil are capable of electromagnetically interacting with the magnet to produce Lorentz forces that move the image sensor in multiple directions relative to the lens group; and
  a flexure suspension arrangement for suspending the image sensor from a base structure, the flexure suspension arrangement comprising:
    a first flexure for suspending the first substrate from the second substrate, wherein the first flexure comprises a first set of one or more flexure arms that allow the first substrate to move, together with the image sensor, in at least a first direction relative to the lens group; and
    a second flexure for suspending the second substrate from the base structure, wherein the second flexure comprises a second set of one or more flexure arms that allow the second substrate to move, together with the first substrate, in at least a second direction orthogonal to the first direction.

11. The device of claim 10, wherein the VCM actuator comprises:
a plurality of autofocus (AF) coils attached to the first substrate or the second substrate, wherein the plurality of AF coils is for moving the image sensor in at least one direction parallel to the optical axis;

a plurality of optical image stabilization (OIS) coils attached to the first substrate or the second substrate, wherein the plurality of OIS coils is attached to a different one of the first substrate or the second substrate than the plurality of AF coils, and wherein the OIS coils is for moving the image sensor in multiple directions orthogonal to the optical axis; and a plurality of magnets, wherein a respective magnet of the plurality of magnets is shared between a respective AF coil of the plurality of AF coils and a respective OIS coil of the plurality of OIS coils, such that the respective AF coil and the respective OIS coil are capable of electromagnetically interacting with the respective magnet.

12. The device of claim 11, wherein the one or more processors are configured to:

control the VCM actuator to move the image sensor in the at least one direction parallel to the optical axis, to provide AF movement of an image on the image sensor, wherein, to control the VCM actuator to provide the AF movement, the one or more processors are configured to:

generate one or more AF control signals that cause one or more AF drive currents to be supplied to at least one AF coil of the plurality of AF coils; and control the VCM actuator to move the image sensor in at least one of the multiple directions orthogonal to the optical axis, to provide OIS movement of the image on the image sensor, wherein, to control the VCM actuator to provide the OIS movement, the one or more processors are configured to:

generate one or more OIS control signals that cause one or more OIS drive currents to be supplied to at least one OIS coil of the plurality of OIS coils.

13. The device of claim 11, wherein:

the plurality of magnets includes the magnet;

the plurality of AF coils includes the first coil and is attached to the first substrate; and the plurality of OIS coils includes the second coil and is attached to the second substrate.

14. The device of claim 13, wherein a respective center of the respective AF coil is closer, relative to a respective center of the respective magnet, to the optical axis.

15. The device of claim 14, wherein a respective center of the respective OIS coil and the respective center of the respective magnet are at a same distance from the optical axis.

16. A system, comprising a flexure suspension arrangement for suspending an image sensor of a camera from a base structure, the flexure suspension arrangement comprising:

a first flexure for suspending a first substrate from a second substrate, wherein the first substrate is fixedly coupled with the image sensor, and wherein the first flexure comprises a first set of one or more flexure arms that allow the first substrate to move, together with the image sensor, in at least a first direction relative to a lens group of the camera; and a second flexure for suspending the second substrate from the base structure, wherein the second flexure comprises a second set of one or more flexure arms that allow the substrate to move, together with the first substrate, in at least a second direction orthogonal to the first direction.

17. The system of claim 16, further comprising:

a first coil of a voice coil motor (VCM) actuator, wherein the first coil is attached to the first substrate, and wherein the first coil is capable of electromagnetically interacting with a magnet of the VCM actuator to move the image sensor in at least the first direction; and a second coil of the VCM actuator, wherein the second coil is attached to the second substrate, and wherein the second coil is capable of electromagnetically interacting with the magnet to move the image sensor in at least the second direction.

18. The system of claim 16, wherein:

the first set of one or more flexure arms is stiffer than the second set of one or more flexure arms, in the second direction; and the second set of one or more flexure arms is stiffer than the first set of one or more flexure arms, in the first direction.

19. The system of claim 16, wherein:

the first set of one or more flexure arms is stiffer than the second set of one or more flexure arms, in the first direction; and the second set of one or more flexure arms is stiffer than the first set of one or more flexure arms, in the second direction.

20. The system of claim 16, wherein the first flexure and the second flexure are formed of a same sheet of metal.

* * * * *